United States Patent Office 2,935,536
Patented May 3, 1960

2,935,536

PRODUCTION OF ORGANO-HALIDES

Seward J. Averill, Boston, and Frank X. Werber, North Royalton, Ohio, assignors to Goodrich-Gulf Chemicals, Inc., Pittsburgh, Pa., a corporation of Delaware No Drawing. Application January 20, 1956
Serial No. 560,470

14 Claims. (Cl. 260—652)

This invention relates to organo-halides and especially to a novel process for the production of organo-halides by the reaction of organo-metals with a halogen, which process enables the organo-halides to be isolated from the reaction mixture economically, in high yields and of high quality.

It is well known that a halogen reacts readily with an organo-metal, the reaction being a strongly exothermic one. Such reaction is represented by the following equation:

$$R_vMe + {}_vX_2 \rightarrow {}_vRX + MeX_v \qquad (1)$$

in which $R_vMe$ is an organo-metal, $v$ being an integer indicating the valency of Me, X is a halogen, RX is an organo-halide and $MeX_v$ is a metal halide. However, it has not heretofore been possible to isolate the organo-halide from the reaction mixture so as to produce the organo-halide commercially.

It is an object of this invention to produce in high yields and in satisfactory quality an organo-halide from an organo-metal. Other objects will be apparent from the following specification.

In an exhaustive study of the above indicated reaction, it has been determined that the metal halide, the $MeX_v$ of the above reaction, catalyzes the isomerization and/or the dehydrohalogenation of the organo-halide as the latter is formed in the inert reaction medium, and that this accounts for the inability to isolate the organo-halide from the reaction medium in any substantial quantity.

After much study and experimentation, it has now been discovered that the above indicated unwanted side reactions can be checked or "neutralized," and the harmful effects of the metal halide on the organo-halide can be substantially eliminated by placing in the reaction medium a chemical which readily reacts to form a "complex" with the metal halide as it is liberated in the reaction medium, but which will not react readily with the organo-metal or the organo-halide, thus inhibiting the above noted harmful effects of the metal halide on the organo-halide.

Such chemicals are herein for convenience termed "complexing agents," that is, chemicals that form a complex with the metal halides so as to leave the metal halides no longer free to act upon the organo-halides. One of such complexing agents is azine, commonly called pyridine. The complex formed is believed to have the following formula:

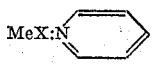

The complexing agent should be miscible with the reaction medium solvent and may itself be a solvent which serves as the reaction medium. Where the complexing agent is added to the inert reaction medium, even less than the stoichiometric quantity of the complexing agent will suffice. However, higher percentages up to the point where the complexing agent comprises the entire reaction medium, give satisfactory results.

Among the complexing agents found to be effective in the production of organo-halides from organo-metals are (1) the tertiary alkylamines, such as trimethylamine, triethylamine, a tripropylamine, a tributylamine, and like higher tertiary alkylamines, and (2) the azines, such as azine itself (pyridine), 1,2-diazine (pyridazine), 1,3-diazine (pyrimidine), 1,4-diazine (pyrazine), 1,2,3-triazine, 1,2,4-triazine, 1,3,5-triazine, 1-benzazine (quinoline), 2-benzazine (isoquinoline), 1,2-benzodiazine (cinnoline), 1,3-benzodiazine (quinazoline), and the like, and also the alkyl and halo-derivatives of the azines, including the methyl, ethyl, propyl, butyl and higher alkyl azines and mixed alkyl azines, such as, 2-methyl-5-ethyl azine, and the chloro-, bromo-, iodo- and fluoro-azines.

The above tertiary alkyl amines, the azines and alkyl and halo-azines, and other chemical compounds which readily form a complex with metal halides, but do not readily react with organo-metals or organo-halides, are all included within the term complexing chemical as that term is used herein.

The metal Me of the organo-metal, $R_vMe$, which constitutes one of the starting materials in the process of this invention, is one in which the metal atom is capable of linking with an organo-radical to form an organo-metal, that is, a compound in which the organo-radical is connected to the metal atom through a carbon atom of the organo-radical.

It is within the scope of this invention to utilize organo-metals of the formula $$R_m\text{—}Me\text{—}X_n \qquad (2)$$

wherein R is an organo-radical including all hydrocarbon and substituted hydrocarbon radicals capable of joining to a metal atom through a carbon atom of the organo-radical to form organo-metals. Thus, alkyl, aryl, aralkyl, cycloalkyl, alkenyl, aralkenyl, cycloalkenyl, hydrocarbon and substituted hydrocarbon radicals may be employed.

The Me of the above Formula 2 includes metals selected from a class consisting of aluminum, antimony, bismuth, cadmium, copper, gallium, germanium, indium, lead, mercury, thallium, tin and zinc.

The X of the above Formula 2 has the same significance as in Formula 1 and represents a halogen, and $m$ and $n$ are digits the sum of which totals the valency of Me and of which $n$ but not $m$ may be zero.

In a preferred embodiment, the hydrocarbon aluminums are utilized as the starting materials for producing the hydrocarbon halides. Thus, triethyl aluminum is halogenated to an ethyl halide, such as, ethyl chloride, ethyl bromide and ethyl iodide; tripropyl aluminum to propyl halides; triisobutyl aluminum to isobutyl halides; tri-n-octyl aluminum to n-octyl halides; tri-n-dodecyl aluminum to n-dodecyl halides; and so on, the higher hydrocarbon aluminums being halogenated into the corresponding higher hydrocarbon halides.

By way of illustration, n-octyl chloride is produced from tri-n-octyl aluminum in accord with the following equation:

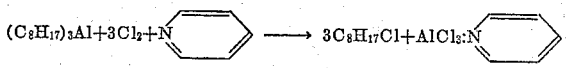

the complexing chemical, azine (pyridine), reacting with the aluminum trichloride in such manner as to deactivate the aluminum trichloride as fast as it is formed and thus to make the aluminum trichloride non-reactive with either the tri-n-octyl aluminum or the n-octyl chloride.

Experience to date indicates that all the hydrocarbon metals react in the same way to produce hydrocarbon halides, and that halides having an atomic weight in excess of 35, namely, chlorine, bromine, and iodine, react more effectively to produce metal halides of satisfactory yield.

*Example 1*

Into a three-necked reactor, equipped with a reflux condenser, a stirrer, a thermometer, an inlet tube for delivery of fluids near the bottom of the reactor, place 400 milliliters of carbon tetrachloride and pass nitrogen through the reactor to remove all air. Add 16.6 g. of pyridine (azine). Cool the reactor in an ice bath. Add 80 g. tri-n-octyl aluminum while stirring and maintaining the temperature of the reactor contents at a temperature below 30° C. Bubble 47 g. chlorine through the reactor contents at such rate as to maintain the reactor contents at a temperature below 30° C.

After all the chlorine has been introduced, add 150 milliliters of water, while still maintaining temperatures below 30° C. Two layers form, an organic layer and a water layer, and are separated as by a separation funnel. Extract the water layer with 100 milliliters of carbon tetrachloride. Combine the extract and the organic layer and wash with 150 milliliters of water followed by washing with 150 milliliters of a 10% solution of $Na_2CO_3$. Dry the washed organic layer over calcium chloride, as by standing over night.

Filter the dried organic solution, and distill the filtrate at atmospheric pressure to remove the carbon tetrachloride. Then fractionally distill at reduced pressures. The cut coming off at 70°–80° C. at 14 mm. pressure contains the n-octyl chloride, which weighs about 73 g., or a yield of about 76% of theoretical. It is a viscous liquid having a refractive index of $n_D^{25}$ 1.4307, and a boiling point of 184–5° C. Analysis shows the end product to be n-octyl chloride having the formula $CH_3(CH_2)_6CH_2Cl$.

In the place of carbon tetrachloride, other perhalogenated hydrocarbons may be employed.

*Example II*

In this example, a different halide, bromine, and a different complexing agent, 1-benzazine (quinoline), are employed.

Into a three-necked 500 milliliter reactor equipped with a reflux condenser, a stirrer, a thermometer, an inlet tube for delivery of gas near the bottom of the reactor, and a dropping funnel, place 200 milliliters of carbon tetrachloride. Bubble dry nitrogen through the reactor contents so as to flush the reactor free of air. Add 14.1 g. of 1-benzazine and cool the reactor to 15° C. in an ice bath. Add 40 g. of tri-n-octyl aluminum, while stirring. Then add 60 g. of bromine, drop-by-drop at a rate to maintain the temperature contents at about 25° C. A purple colored solid precipitates out of the reaction mixture. Dissolve the precipitate by adding 150 milliliters of water. The reactor contents separates into two layers, an organic layer and a water layer. Collect each of the two layers in a different receptacle. Wash the organic (carbon tetrachloride) layer with 150 milliliters of water, then with 150 milliliters of a 10% solution of $NaHSO_3$, followed by a washing with a 10% solution of $Na_2CO_3$. Dry the washed organic portion over calcium chloride, as by standing over-night.

Filter and distill off at atmospheric pressure the carbon tetrachloride of the filtrate. Fractionally distill the residue at reduced pressures. The cut at B.P. 56°–60° C. at 1.6 mm. pressure, weighed 44 grams. The theoretical yield being 63.2 g.; the actual yield was 70%. The n-octyl bromide was a slightly colored liquid having a boiling point of 202–3° C. and a refractive index of $1.4503^{25}$, and was ascertained to have the following formula: $CH_3(CH_2)_6CH_2Br$.

*Example III*

In this example, a halide different from those of the prior Examples I and II is used, namely, iodine, and also a different complexing agent, namely, tripropylamine.

With apparatus the same as in Example II, place 150 milliliters of carbon tetrachloride in the reactor, flush the reactor with dry nitrogen to remove the air, and add 40 g. of tri-n-octyl aluminum. Cool the reactor in an ice bath, while adding 15.6 g. of tripropylamine, stirring all the while.

Dissolve 10.5 g. of iodine in 50 milliliters of carbon tetrachloride and add the iodine solution drop-by-drop through the dropping funnel at such a rate as to maintain a reaction temperature of around 25° C. throughout the reaction, the reactor being cooled by an ice bath. After the iodine has been introduced, add 150 milliliters of water. The stirring is discontinued and the reactor contents gradually separate into two layers, an organic layer and a water layer. Each of the two layers is placed in a separate receptacle, and about 75 milliliters of water added to each. The water layer is extracted with about 100 milliliters of carbon tetrachloride and the extract added to the organic layer, which is washed with 100 milliliters of water, then with 100 milliliters of a 10% solution of $NaHSO_3$ followed by a washing with 100 milliliters of a 10% solution of $Na_2CO_3$. The organic layer is then dried over calcium chloride, as by setting overnight.

The dried organic layer of the reaction product is distilled at atmospheric pressure to remove the low boiling solvents, and then is fractionally distilled. The cut boiling at 39°–40° C. at 0.2 mm. contains the n-octyl iodide, the yield being 46 g. or 74%. The n-octyl iodide, $CH_3(CH_2)_6CH_2I$, has a molecular weight of 240, a boiling point of 255–6° C., and a refractive index of $1.489^{20}$.

*Example IV*

In certain instances, where the complexing agent is not only a chemical which will react to form a complex with the metal halide but will not react with the hydrocarbon halide, but also a solvent suitable for the reaction medium, then that chemical may be used to perform both functions. Pyridine is capable of performing both functions. This is illustrated in the following example.

Utilizing the apparatus described in Example I, place 200 milliliters of pyridine in the reactor. Bubble dry nitrogen through the reactor contents to flush the air out of the reactor with nitrogen. Cool the reactor in an ice bath. Add 100 milliliters of tri-n-octyl aluminum. Add 50 g. of chlorine gas, bubbling it through the reactor contents at a rate that will maintain the temperature of the reactor contents under 30° C.

After the chlorine is added, the reaction mixture is poured over about 250 milliliters of cracked ice in a receptacle. A slurry of solid and liquid form. Enough concentrated hydrochloric acid is added to dissolve the solids. Two layers separate out, and the organic layer is separated from the water layer. Extract the water layer with ether, and add the ether extract to the organic layer. Wash the organic layer with 100 milliliters of dilute hydrochloric acid, follow by washing with 100 milliliters of water. Add anhydrous calcium chloride to the combined organic and ether extract layer, and allow to dry over-night.

Filter the dried organic layer, distill the filtrate at atmospheric pressure to remove ether and pyridine, and then fractionally distill the residue at reduced pressure. The cut containing the tri-n-octyl chloride produced 44.5 g. of a clear viscous liquid having a refractive index of $1.4308^{25}$ and a boiling point of 57°–63° C. at 9 mm. pressure.

*Example V*

Following the procedure of Example II, but utilizing tetraisobutyl tin as the hydrocarbon metal, bromine as the halogenating agent and 1,3-diazine (pyrimidine) as the complexing agent, after all the bromine is added, pour the reactor contents into 350 milliliters of water, then add 25 milliliters of concentrated hydrochloric acid. Two layers separate out, and the organic layer is separated from the water layer. The water layer is extracted with carbon tetrachloride and the extract added to the organic layer. This organic portion is washed and dried as in Example II. The dried organic portion is filtered, and distilled at atmospheric pressure to remove the carbon tetrachloride, and then fractionally distilled at reduced pressure. The cut having a boiling point of 52–53° C. at 0.5 mm. pressure weighed 48.0 g. and was identified as isobutyl bromide. The yield is 76%.

*Example VI*

Following the procedure of Example I, various hydrocarbon halides are produced as noted hereinbelow. Thus, by utilizing:

(a) Tri-n-hexyl aluminum and chlorine to form n-hexyl chloride, a colorless liquid having a boiling point of about 132° C.;

(b) Tri-n-hexyl aluminum and bromine to form n-hexyl bromide, a colorless liquid having a boiling point of 156° C.;

(c) Tri-n-heptyl aluminum and chlorine to form n-heptyl chloride, a colorless liquid having a boiling point of 159° C.;

(d) Tri-n-heptyl aluminum and bromine to form n-heptyl bromide, a colorless liquid having a boiling point of 179° C.;

(e) Tri-n-decyl aluminum and iodine to form n-decyl iodide, a liquid having a boiling point of 132° C. at 15 mm. pressure;

(f) Tri-n-dodecyl aluminum and bromine to form n-dodecyl bromide, a liquid having a boiling point of 175–80° C. at 45 mm. pressure, and commonly known as lauryl bromide;

(g) Tri-n-hexadecyl aluminum and iodine to form n-hexadecyl iodide, a plate-like crystalline solid having a melting point of 22° C. and a boiling point of 211° C. at 15 mm. pressure and commonly known as cetyl iodide;

(h) Tri-n-hexacosyl aluminum and bromine to form n-hexacosyl bromide, commonly known as ceryl bromide;

(i) Tri-n-tetracontyl aluminum and bromide to form tetracontyl bromide, or $n-C_{40}H_{81}Br$.

(j) Tristyryl aluminum and chlorine to form styryl chloride or chlorophenylethylene, a liquid having a boiling point of about 139° C.;

(k) Triphenyl aluminum and bromine to form phenyl bromide, a colorless oily liquid having a boiling point of about 155° C.;

(l) Tetracyclohexyl tin and chlorine to form cyclohexyl chloride, a colorless liquid having a boiling point of about 143° C.

*Example VII*

While experience to date has indicated that the hydrocarbon aluminums are preferable starting hydrocarbon metals for the purpose of this invention, any of the known hydrocarbon metals may be employed in carrying out the process of this invention. Thus, there may be employed:

(1) Penta-n-butyl antimony and chlorine to form n-butyl chloride;

(2) Penta-ethyl bismuth and bromine to form ethyl bromide;

(3) Di-isoamyl cadmium and iodine to form isoamyl-iodide;

(4) Tetra-n-hexyl germanium and bromine to form n-hexyl bromide;

(5) Tetra-isobutyl lead and chlorine to form isobutyl chloride;

(6) Di-hexyl mercury and bromine to form n-hexyl bromide;

(7) Tri-ethyl gallium and iodine to form ethyl iodide;

(8) Tetra-isobutyl indium and chlorine to form isobutyl chloride;

(9) Tri-isobutyl antimony and bromine to form isobutyl bromide;

(10) Tri-n-amyl tin and bromine to form n-amyl bromide;

(11) Di-isobutyl zinc and chlorine to form isobutyl chloride.

It is to be understood that variations in the procedure set forth in the specification and that modifications in the selection and proportions of the constituents utilized in the process, such as may be made by the usual knowledge of those skilled in the art, may be made without departing from the scope and spirit of the invention as set forth in the specification and in the following claims.

What is claimed is:

1. A process of manufacturing an organo-halide by the reaction with a halogen of an organo-metal of the formula $R_m$—Me—$X_n$, wherein R is a hydrocarbon radical, Me is a metal selected from the class consisting of aluminum, antimony, bismuth, cadmium, copper, gallium, germanium, indium, lead, mercury, thallium, tin and zinc, X is a halogen, and $m$ and $n$ are numbers whose sum totals the valency of Me and of which $n$ but not $m$ may be zero, which process comprises gradually adding an organo-metal as above defined to a liquid mixture of an inert organic solvent and a complexing chemical selected from the class consisting of the tertiary alkylamines, the azines, the alkyl-azines and the halo-azines, while agitating and cooling the resulting liquid mixture to a temperature ranging from about 15° C. to 30° C. to remove the exothermically generated heat therefrom, then adding a halogen slowly to said liquid mixture, while continuing the cooling, at such a rate as to maintain the liquid mixture at a temperature ranging from about 15° C. to 30° C., whereby the halogen reacts with the organo-metal to produce an organo-halide and a metal halide, the latter reacting as it is formed with the said complexing chemical to produce a metal halide complex which is not reactive with the organo-metal or the organo-halide, and recovering the organo-halide from the liquid mixture.

2. The process defined in claim 1 wherein the complexing chemical is a tertiary alkylamine.

3. The process defined in claim 1 wherein the complexing chemical is an azine.

4. The process defined in claim 1 wherein the complexing chemical is pyridine.

5. The process defined in claim 1 wherein the halogen has an atomic weight in excess of 35.

6. The process defined in claim 1 wherein the $n$ of the formula $R_m$—Me—$X_n$ is zero.

7. The process defined in claim 1 wherein the organo-metal is a tri-alkyl aluminum, the inert organic solvent is a perhalogenated hydrocarbon, the complexing chemical is an azine, and the halogen has an atomic weight in excess of 35.

8. The process defined in claim 1 wherein the organo-metal is tri-n-octyl aluminum, the organic solvent is carbon tetrachloride, the complexing chemical is pyridine, and the halogen is chlorine.

9. A process for the manufacture of a hydrocarbon halide by reaction of a hydrocarbon aluminum with a halogen which comprises adding gradually to a liquid mixture of an inert organic solvent and a complexing chemical selected from the class consisting of the tertiary alkylamines, the azines, the alkyl-azines and the haloazines, a hydrocarbon aluminum of the formula $R_m$—Al—$X_n$, in which R is a hydrocarbon radical having from 2 to 40 carbon atoms, X is a halogen, and $m$ and $n$ are digits the sum of which totals three and of which $n$ but not $m$ may be zero, agitating and cooling said liquid mixture during the said addition to a temperature ranging from about 15° C. to 30° C. to remove exothermically generated heat therefrom, then adding a halogen slowly to said liquid mixture, while continuing the agitation and cooling, at such a rate as to maintain the resulting liquid mixture at a temperature lower than 30° C., whereby the halogen reacts with the hydrocarbon aluminum to produce a hydrocarbon halide and an aluminum halide, the latter reacting as it is formed with the complexing chemical to produce an aluminum halide complex which is non-reactive with the hydrocarbon halide, and recovering the hydrocarbon halide from the resulting liquid mixture.

10. The process defined in claim 9 wherein the complexing chemical is pyridine.

11. The process defined in claim 9 wherein the complexing chemical is quinoline.

12. The process defined in claim 9 wherein the complexing chemical is tripropylamine.

13. The process defined in claim 9 wherein the hydrocarbon metal is a tri-alkyl aluminum, the solvent is a perhalogenated hydrocarbon, the complexing chemical is an azine, and the halogen has an atomic weight in excess of 35.

14. The process defined in claim 9 wherein the hydrocarbon metal is a tri-alkyl aluminum, the solvent is carbon tetrachloride, the complexing chemical is pyridine, and the halogen is chlorine.

References Cited in the file of this patent

UNITED STATES PATENTS

| | | |
|---|---|---|
| 2,176,181 | Hunsdiecker et al. | Oct. 17, 1939 |
| 2,798,891 | Schaeffer | July 9, 1957 |

OTHER REFERENCES

Whitmore et al.: Jour. Am. Chem. Soc., vol. 61, pp. 1585–6 (1939).

Sidgwick: Chemical Elements and Their Compounds, vol. I, p. 241 (1950).

Rodd: Chemistry of Carbon Compounds, vol. IA, pp. 422–3 (1951).